3,228,873
SWEETENING OF SOUR PETROLEUM
DISTILLATES
Douglas J. Youngblood, Groves, and Johan C. D. Oosterhout and Levi C. Parker, Port Arthur, Tex., assignors to Texaco Inc., New York, N.Y., a corporation of Delaware
Filed Dec. 13, 1963, Ser. No. 330,284
7 Claims. (Cl. 208—191)

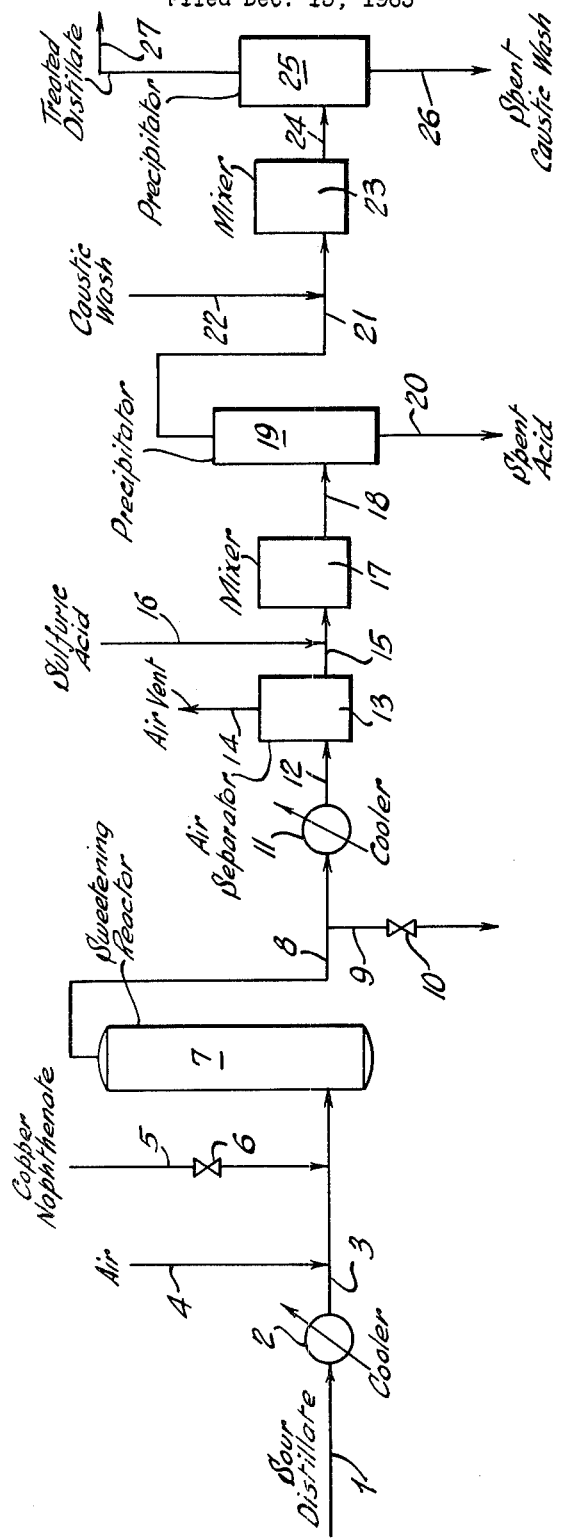

This invention relates to a method of sweetening sour petroleum distillates. More specifically, it pertains to a method of reducing the mercaptan content of liquid petroleum distillates while simultaneously preparing and maintaining a copper naphthenate-solid adsorbent support bed in contact with the distillate without a significant copper carry-over into the sweetened product.

In the petroleum art relating to the conversion of sour mercaptans in petroleum distillates into disulfides, copper compounds are often used in combination with air as the sweetening agent. One prior art method calls for the impregnation of an adsorbent material such as fuller's earth or charcoal with an aqueous solution of cupric halide such as cupric chloride and contacting the impregnated material with a sour distillate-air mixture. The cupric chloride reacts with the mercaptan to form a disulfide, cuprous chloride and hydrochloric acid. The oxygen reacts with the formed cuprous chloride and hydrochloric acid to reform cupric chloride. The following equations further illustrate the reaction:

(a)  $4CuCl_2 + 4RSH \rightarrow ZRSSR + 4CuCl + 4HCl$
(b)  $4CuCl + 4HCl + O_2 \rightarrow 4CuCl_2 + 2H_2O$ R in the above formulas is hydrocarbyl such as aryl and alkyl.

Another prior art method called for introducing a mixture of air and copper naphthenate into a stream of sour petroleum distillate, subjecting the resultant mixture to turbulent conditions thereby forming a sweetened metal naphthenate containing distillate. The following equations further illustrate this second prior art method:

$$4RSH + O_2 \xrightarrow[\text{Catalyst}]{\text{Cu Naph.}} 2RSSR + 2H_2O$$

In the above equation R is as heretofore defined.

As can be seen in the first prior art method the copper chloride functions as a reactant with oxygen functioning as a reactant regenerant. In the second prior art method the copper naphthenate functions as a catalyst with oxygen directly reacting with the mercaptan.

Although the aforedescribed prior art sweetening methods function satisfactorily in decreasing the mercaptan content of sour petroleum distillates, they have several material disadvantages from a commercial point of view.

One drawback in both prior art methods is that there is a significant quantity of copper compound(s) derived from the copper reagents and catalysts carried over into the final sweetened product. These copper compounds such as copper mercaptides, halides and naphthenates cause the final sweetened distillate to have poor color stability upon storage. For example, they react with nitrogenous and organic acid materials in stored sweetened distillate to form undesired color bodies therein. In order to counteract this deleterious effect of the copper compounds the prior art often incorporates in the distillate a metal deactivator such as N,N'-disalicylal-1,2-diaminopropane or an oxidation inhibitor such as N,N'-di-(secondary butyl)-p-phenylenediamine. Although metal deactivators and oxidation inhibitors prevent the "carry-over" copper compounds from causing formation of undesirable color bodies in the distillate, they substantially add to the cost of the distillate product from a material and process complexity point of view. Furthermore, customer requirements often do not permit the use of metal deactivator and/or oxidation inhibitor.

A second undesirable feature which is particularly pertinent to the copper halide process is that preparation of the catalyst bed is required prior to contact of the bed with sour distillate. Further, when the cupric halide in the reactant bed needs to be replenished, sometimes the sweetening process has to be shut down and the catalyst bed treated with fresh aqueous cupric halide. A more desirable process from a cost and process efficiency point of view would permit the preparation of the catalyst bed and replenishment of the catalyst therein simultaneously with the sweetening of the sour distillate.

A third disadvantage which is particularly pertinent to the aforementioned prior art copper naphthenate sweetening process is that a relatively large amount of copper naphthenate is required since it is uneconomical to recover from the final product, and therefore, is not reused. The continuous loss of the copper naphthenate and the need of employing metal deactivator and/or oxidation inhibitor to counteract the deleterious effect of metal naphthenate carried over into the sweetened distillate adds considerably to the cost of the sweetening process.

We have discovered, and this constitutes our invention, an improved air-copper naphthenate catalyst sweetening treatment of sour petroleum liquid distillate whereby there is no copper compound carry-over into the sweetened product or at least substantially less carry-over than heretofore attainable. This absence or reduction of copper carry-over eliminates or at least substantially reduces the amount of metal deactivator necessary to insure maintenance of satisfactory color of the product during storage. Also, it permits the efficient use of catalyst since it is continuously reused and not lost in the product. Further, we have discovered a method which does not require advance copper catalyst impregnation into a stationary adsorbent material bed but permits the metal catalyst naphthenate to be impregnated into and maintained in an effective amount on an adsorbent material bed while simultaneously permitting the copper naphthenate to function as an oxidation catalyst in the conversion of sour mercaptains into disulfides.

The foregoing features of our process have obvious advantages from a product quality, simplicity and cost standpoint over the aforementioned prior art treatments which have copper catalyst carry-over into the sweetened product and require as separate steps the catalyst bed formation and passage of sour hydrocarbon thereover.

Specifically, our method calls for the introduction of air and copper naphthenate into a sour petroleum liquid distillate, contacting the copper naphthenate-oxygen containing distillate with a bed of solid, particulate adsorbent material at a temperature between about 260 and 350° F. and withdrawing from the bed a distillate of reduced mercaptan content containing no or insignificant amounts of copper compound derived from the catalyst. The introduction of copper naphthenate catalyst into the initial sour petroleum distillate stream is continued until the copper content on the adsorbent bed reaches between about 0.05 to 1.0 wt. percent, whereupon the copper naphthenate introduction into the sour distillate is stopped and resumed at subsequent intervals only to restore the catalytic activity to the desired level. This restoration is advantageously effected by reintroducing the copper naphthenate into the sour distillate, e.g., in an amount of between about 5 and 50 lbs./thousand (M) barrels (bbls.) distillate for a period of between about 1 and 24 hours. The decrease in catalytic activity is believed caused by fouling of the catalyst bed, i.e., the build up of gummy deposits on the catalyst.

Two unexpected features of the foregoing process are that the copper naphthenate, although petroleum distillate soluble, is essentially completely adsorbed on the contemplated adsorbent support materials under the claimed process conditions and copper naphthenate and copper compounds derived from the catalyst are not normally carried over into the sweetened product. A second unexpected feature is that at adsorbent bed temperatures below about 260° F. there is a substantial and undesirable increase of copper carry-over from the adsorbent bed into the sweetened distillate product discharged from the sweetening reactor.

Under advantageous conditions, the quantity of air introduction into the sour distillate is between about 0.5 and 10 standard cubic feet (s.c.f.)/bbl. of distillate. The amount of copper naphthenate injection when needed is between about 5 and 500 lbs./Mbbls. of sour distillate. Although the rate of sour distillate passing in contact with the copper naphthenate-clay catalyst bed is dependent on the quantity of the mercaptan sulfur in the charge distillate and the effective size of the catalyst bed, it will be normally between about 1 and 30 volumes distillate/hour/volume catalyst bed.

Although the copper naphthenate may be introduced into the sour distillate in its solid form, it is desirably added as a liquid solution in order to provide better contact with the sour distillate and adsorbent carrier. Organic solvent materials which may be employed to solubilize the copper naphthenates are hydrocarbon liquids such as benzene and turpentine. However, the most preferred solvent for the catalyst is the sour distillate to be treated. The concentration of copper in the copper naphthenate solution is advantageously between about 0.1 and 6 wt. percent. Superatmospheric pressure can be employed when desirable or necessary to maintain all or part of the liquid distillate in the liquid phase under the process conditions. Air pressures normally utilized are between 0 and 200 p.s.ig.

The sour feed distillates contemplated herein are normally those mercaptan containing petroleum liquid distillates having boiling points in the range between about 100 and 600° F. Specific examples are virgin naphtha, adsorption naphtha, thermally cracked naphtha, catalytically cracked naphtha, straight run gasoline, catalytically cracked gasoline, straight run kerosine and fuel oil, catalytically cracked kerosine and fuel oil and mixtures thereof. Although petroleum distillates having mercaptan sulfur contents outside the range of between about .0003 and .04 wt. percent are operative, sour distillates having mercaptan sulfur contents within said range are particularly suitable in our process which under normal operative conditions will eliminate or at least reduce the mercaptan sulfur content to below about .0003 wt. percent, i.e., to "doctor" sweet.

Examples of suitable solid adsorbent supports for the copper naphthenate catalyst contemplated herein are any of the well known adsorbent materials associated with "sweetening" art such as bauxite, fuller's earth, bentonite, Attapulgus clay, charcoal, silica-alumina mixtures, and montmorillonite. The finely divided adsorbent support material preferably has a particle size of between about 4 - 60 U.S. Standard mesh. Although higher and lower mesh sizes can be employed, they are less desirable in that mesh sizes above 60 permit the carryover of some of the adsorbent material in the sweetened distillate and those below about 4 are too coarse to promote thorough contact of the copper naphthenate with the sour distillate.

In a preferred embodiment of our invention, the sweetened distillate withdrawn from the copper naphthenate-adsorbent support sweetening reactor is further treated to improve (lighten) the color of the distillate which has been color degraded (darkened) by the previous treatments of the distillate including that caused by the relatively high temperatures in the sweetening reactor. Where a substantial color improvement is required the sweetened distillate is contacted with sulfuric acid followed by the separation of the acid from the distillate by standard means, e.g., utilizing an electrostatic precipitator. The thus separated distillate may be subjected to an alkaline wash, e.g., aqueous alkali metal hydroxide, to neutralize any acid material carried over from the acid treatment. As a side benefit the alkaline wash also removes undesirable materials from the distillate such as naphthenic acid, phenols and thiophenols.

Under advantageous conditions the acid treating is conducted at a temperature between about 40 and 110° F. utilizing sulfuric acid strengths of between about 80 and 100 wt. percent and acid quantities between about 0.25 and 5 lbs./bbl. of distillate. As to the alkaline wash, the concentration and amount should be sufficient to render neutral the acid treated distillate. The wash is desirably conducted at temperatures between about 40 and 110° F. One particularly suitable acid treating material for our process from a commercial standpoint is spent alkylation acid which is used sulfuric acid taken from petroleum alkylation units. This acid normally is composed of about 90% sulfuric acid and about 10% hydrocarbon materials and water. Preferred alkaline wash material is between about 1 and 10 wt. percent aqueous sodium hydroxide employed in an amount of between about .01 and .5 lb. of solid caustic/bbl. of distillate.

Milder color improvement treatments can be employed where color degradation has not been severe. In one milder treatment the sweetened distillate is contacted with a caustic wash followed by clay filtration.

It is to be noted that the color improvement step can be omitted from our process if product specifications do not require an improvement in color of the distillate issuing from the sweetening reactor.

The following examples further illustrate the invention but are not to be taken as limitations thereof.

EXAMPLE I

This example illustrates one embodiment of the method of the invention. It is to be noted that the acid treating and alkaline wash steps recited below are preferred features.

Referring to the flow diagram, crude steam still kerosine having a boiling point range between about 320 and 500° F., a 50 vol. percent boiling point at 425° F., a mercaptan sulfur content of .0059 wt. percent and a Saybolt color of 30 (ASTM D–156–53T) was passed through line 1 at 400° F. to cooler 2, where the temperature was reduced to 280° F. and thence was directed through line 3 to reactor 7. Between cooler 2 and reactor 7 air was introduced into line 3 at a rate of 6 s.c.f./bbl. charge kerosine through line 4. Also copper naphthenate was introduced into line 3 through line 5 as a kerosine solution containing 4 wt. percent copper in an amount of 100 lbs. copper naphthenate solution/M bbls. kerosine. It is to be noted the order of addition of the copper naphthenate and air to line 3 is not critical. The copper naphthenate introduction was continued until the copper content on the absorbent bauxite in reactor 7 reached a calculated value of 0.1 wt. percent whereupon valve 6 in line 5 was closed. Valve 6 was opened only when the activity of the catalyst fell to a level such that the sweetened product issuing from reactor 7 did not pass the well known "doctor" test. The opening and closing of valve 6 was repeated as required to maintain the desired active copper level on the adsorbent material. The kerosine-air-copper naphthenate mixture was passed from line 3 into reactor 7 maintained at 280° F., said reactor containing a fixed bed of bauxite of a particle size of 8 to 14 mesh (U.S. Standard). The air-copper-naphthenate-kerosine mixture was passed up through reactor 7 at a liquid rate of 4 volume liquid/hour/volume catalyst bed wherein the conversion of the mercaptan in the kerosine by catalytic air oxidation to disulfide was completed and the copper naphthenate was adsorbed on the bauxite bed. The sweetened kerosine-residual air mixture was withdrawn through line 8 and passed into cooler 11 where the temperature was reduced to 90° F. From cooler 11 the air-containing sweetened distillate was passed through line 12 into air separator 13 and the air was vented through line 14. The de-aired sweetened kerosine was withdrawn through line 15 from air separator 13. During and after the introduction of copper naphthenate into line 3 from line 5, valve 10 was opened for a short period and sample portions of distillate were drawn off from line 8 through line 9 for a mercaptan sulfur, copper content and Saybolt color analysis. The analysis found 0.0 wt. percent mercaptan sulfur, 0.0 wt. percent copper, a Saybolt color of +10 and a Saybolt color of +8 after heating 16 hours at 212° F. The remainder of the sweetened kerosine was passed through line 15. Used sulfuric acid (90%) derived from an alkylation unit was introduced into line 15 through line 16 at a rate of 1.2 lbs. acid/bbl. sweetened kerosine. The kerosine-acid mixture was directed through line 15 into mixing valve 17, from mixing valve 17 to line 18 and thence into electric precipitator 19. The separated acid was withdrawn through line 20 and the acid treated distillate was removed through line 21. Into line 21 there was intoduced through line 22 four wt. percent aqueous sodium hydroxide in an amount of 0.5 lb. caustic/bbl. kerosine. The hydroxide-kerosine mixture was passed through line 21 into mixing valve 23 and in turn into line 24 and thence into electrostatic precipitator 25. The spent caustic was withdrawn from the bottom through line 26 and the sweetened, acid treated, neutralized kerosine product was withdrawn through line 27. The withdrawn kerosine was analyzed and found to have a mercaptan sulfur content of 0.0 wt. percent, a copper content of 0.0 wt. percent, a Saybolt color of +30 and a Saybolt color after heating for 16 hours at 212° F. of +27.

EXAMPLE II

This example illustrates the process of the invention at various operation conditions.

The procedure of Example I was essentially repeated except the operating conditions were varied and the sweetened product was drawn off through line 9 for mercaptan sulfur analysis. The test data and results are reported below in Table I:

Table I

| Run No. | Reactor Temp., °F. | Air Rate S.C.F./bbl. | Distillate Flow Rate[1] | Mercaptan Sulfur Charge, grams/liter | Mercaptan Sulfur Product, grams/liter |
|---|---|---|---|---|---|
| 1 | 260 | 3 | 2.7 | .073 | .006 |
| 2 | 280 | 6 | 4.0 | .048 | .001 |
| 3 | 310 | 3 | 3.9 | .130 | None |
| 4 | 320 | 3 | 24 | .006 | None |
| 5 | 330 | 4 | 7.1 | .049 | .003 |

[1] Volume distillate/hour/volume of supported catalyst.

EXAMPLE III

Referring to the flow diagram, this example illustrates the criticality of maintaining the temperature above 260° F. in sweetening reactor 7.

In several runs the procedure of Example I was essentially repeated except cooler 2 was adjusted so as to vary the temperature in reactor 7. Further, the sweetened product was drawn off through line 9 and the acid treating and neutralizing steps were eliminated. The data and results are found below in Table II.

Table II

| Run | Reactor 7 Temperature, °F. | Copper Content In Sweetened Kerosine taken from line 9, p.p.m. |
|---|---|---|
| A | 220 | >0.05 |
| B | 240 | >0.05 |
| C | 260 | <0.01 |
| D | 270 | <0.01 |
| E | 280 | <0.01 |
| F | 310 | <0.01 |

As can be seen from the above there is a sharp increase in copper content at temperatures below 260° F. As previously pointed out, the copper content in the sweetened product is desirably kept at a minimum since copper tends to accelerate the color degradation of the sweetened product on storage.

EXAMPLE IV

This example further illustrates the feature of the invention relating to the lack of copper carry-over into the sweetened distillate product after distillate passage through the adsorbent bed during copper naphthenate injection into the distillate stream.

The procedure of Example I was essentially followed except the reactor 7 temperature was 310° F., the air rate 7 s.c.f./bbl. and the flow of distillate through reactor 7 ranged between 2 and 5 volumes distillate/hour/volume catalyst. The sweetened product was drawn off through line 9 during copper naphthenate injection through line 5. The resultant data are as follows:

Table III

| Run | Cu. Naph. Injection Rate, lbs./M bbls. | Cu. Content Charge Distillate (line 1), p.p.m. | Cu. Content Line 9 Product, p.p.m. |
|---|---|---|---|
| AA | 110 | <.01 | <.01 |
| BB | 180 | <.01 | <.01 |

EXAMPLE V

This example illustrates reactivation of the copper naphthenate catalyst bed.

Referring to the procedure of Example I and the flow diagram, kerosine distillate having a charge mercaptan content of .035 gram/liter was passed through a used copper naphthenate-bauxite catalyst bed in reactor 7 at a bed temperature of 310° F., an air rate of 3 s.c.f/bbl. distillate and a distillate flow of 5.3 volume distillate/hour/volume catalyst bed. The mercaptan sulfur content of the distillate taken from line 9 was an unsatisfactory 0.1 gram per liter of distillate. Subsequently, a kerosine solution of copper naphthenate was introduced through line 5 into line 3 at a rate of 40 lbs. per thousand barrels of sour distillate for a four hour period. At the end of the four hour period the mercaptan sulfur content of the distillate drawn from line 9 was less than .0003 gram/liter.

We claim:
1. A method of reducing the mercaptan content of a liquid petroleum distillate comprising introducing air and copper naphthenate catalyst into a stream of said distillate, contacting the resultant distillate-air-copper naphthenate mixture with a zone of particulate adsorbent material at a temperature of above about 260° F., continuing said copper naphthenate introduction until the content of said copper in said adsorbent material is in the range between about 0.05 and 1.0 wt. percent, periodically reintroducing said copper naphthenate to maintain catalytic activity and withdrawing from the adsorbent material zone said petroleum distillate of reduced mercaptan content.

2. The process in accordance with claim 1 wherein said distillate is introduced into the adsorbent material zone at a rate of between about 1 and 30 volumes distillate/hour/volume adsorbent material, said air is introduced at between about 0.5 and 10 s.c.f./bbl. of said distillate, said copper naphthenate being introduced in a dosage of between about 5 and 500 lbs./Mbbls. of said distillate, said adsorbent material is of a U.S. Standard mesh size of between about 4 and 60 and said air pressure is between about 0 and 200 p.s.i.g.

3. A process in accordance with claim 1 wherein the sweetened distillate withdrawn from the adsorbent material zone is contacted with sulfuric acid and separated therefrom and subsequently contacted with an aqueous alkaline wash and then separated from said wash.

4. A method in accordance with claim 3 wherein the sulfuric acid contacting is conducted at a temperature between about 40 and 110° F., said acid is between about 80 and 100 wt. percent sulfuric acid and said sulfuric acid contacting is conducted in an acid amount of between about 0.25 and 5 lbs. of acid/bbl. of distillate.

5. A method in accordance with claim 3 wherein said acid strength is between about 80 and 100 wt. percent, the acid contacting is effected at between about 40 and 110° F., in an amount between about 0.25 and 5 lbs. acid/bbl. of said distillate, said alkaline wash is between about 1 and 10 wt. percent aqueous caustic in an amount between about 0.01 and 0.5 lb. caustic/bbl. of distillate, and said alkaline contacting is conducted at between about 40 and 110° F.

6. A method in accordance with claim 1 wherein said distillate is kerosine, said adsorbent material is bauxite, said distillate has an initial mercaptan sulfur content of between about .0003 and .04 wt. percent and a boiling point between about 100 and 600° F.

7. A method of reducing the mercaptan content of a liquid petroleum distillate having boiling points in the range of between about 100 and 600° F. comprising introducing air into a stream of said distillate in an amount between about 0.5 and 10 s.c.f./bbl. of said distillate followed by the introduction of copper naphthenate in a solution of said distillate containing between 0.1 and 6 wt. percent copper in an amount of between 5 and 500 lbs. metal naphthenate/Mbbls, of said distillate, contacting the resultant distillate with a zone of bauxite having a U.S. Standard mesh size between 4 and 60 at a temperature of between about 260° F. and 350° F. under an air pressure of between about 0 and 200 p.s.i.g., continuing said copper naphthenate introduction until the content of said metal in said adsorbent material is in the range of between about 0.05 and 1.0 wt. percent, periodically reintroducing said copper naphthenate to maintain active copper content in said range, withdrawing from said adsorbent material zone said petroleum distillate of reduced mercaptan content, contacting said withdrawn distillate with between about 80 and 100 wt. percent sulfuric acid in an amount of between about 0.25 and 5 lbs. sulfuric acid/bbl. distillate at a temperature of between about 40 and 110° F., separating the acid and contacting said separated distillate with between about 1 and 10 wt. percent aqueous alkali metal hydroxide in an amount of between about 0.01 and 0.5 lb. alkali metal hydroxide per barrel of distillate, said alkali metal hydroxide contacting conducted at a temperature of between about 40 and 110° F., and separating said alkaline treated distillate from said aqueous alkali metal hydroxide.

References Cited by the Examiner
UNITED STATES PATENTS

| | | | |
|---|---|---|---|
| 1,654,581 | 1/1928 | Cross | 208—193 |
| 2,621,147 | 12/1952 | Oosterhout et al. | 208—191 |
| 2,627,496 | 12/1963 | Stratford | 208—273 |

FOREIGN PATENTS 944,054  12/1963  Great Britain.

DELBERT E. GANTZ, *Primary Examiner.*

ALPHONSO D. SULLIVAN, *Examiner.*

UNITED STATES PATENT OFFICE
CERTIFICATE OF CORRECTION

Patent No. 3,228,873                                January 11, 1966

Douglas J. Youngblood et al.

It is hereby certified that error appears in the above numbered patent requiring correction and that the said Letters Patent should read as corrected below.

Column 1, line 31, for "ZRSSR" read -- 2RSSR --; column 2, line 43, for "mercaptains" read -- mercaptans --; column 4, line 60, for "absorbent" read -- adsorbent --; column 6, line 50, after "flow" insert -- rate --; column 8, line 18, after "acid" insert -- contacted distillate from said sulfuric acid --.

Signed and sealed this 13th day of December 1966.

(SEAL)
Attest:

ERNEST W. SWIDER                           EDWARD J. BRENNER
Attesting Officer                                 Commissioner of Patents